US012628736B2

(12) United States Patent
Elonsson et al.

(10) Patent No.: US 12,628,736 B2
(45) Date of Patent: May 19, 2026

(54) SKID PLATE

(71) Applicant: HUSQVARNA AB, Huskvarna (SE)

(72) Inventors: Martin Elonsson, Huskvarna (SE); Ronny Olsen, Nässjö (SE); Svante Larsson, Eksjö (SE); Peter Ahlin, Jönköping (SE); Markus Petersson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 447 days.

(21) Appl. No.: 18/142,182

(22) Filed: May 2, 2023

(65) Prior Publication Data

US 2023/0345868 A1 Nov. 2, 2023

(30) Foreign Application Priority Data

May 2, 2022 (SE) .................................... 2250525-9

(51) Int. Cl.
| | |
|---|---|
| *A01D 34/82* | (2006.01) |
| *A01D 34/00* | (2006.01) |
| *A01D 34/73* | (2006.01) |
| *A01D 101/00* | (2006.01) |

(52) U.S. Cl.
CPC ......... *A01D 34/828* (2013.01); *A01D 34/008* (2013.01); *A01D 34/73* (2013.01); *A01D 2101/00* (2013.01)

(58) Field of Classification Search
CPC .. A01D 34/73; A01D 34/008; A01D 2101/00; A01D 34/74; A01D 34/66; A01D 34/664; A01D 34/82; A01D 34/828; A01D 34/63; A01D 34/00
See application file for complete search history.

(56) References Cited

U.S. PATENT DOCUMENTS

| | | | | |
|---|---|---|---|---|
| 3,103,094 | A | | 9/1963 | Cook |
| 3,415,043 | A | | 12/1968 | Shones |
| 4,422,211 | A | * | 12/1983 | Chernosky ............ E01H 1/0836 |
| | | | | 37/243 |
| 4,443,998 | A | * | 4/1984 | Neuerburg ........... A01D 34/664 |
| | | | | 56/13.6 |

(Continued)

FOREIGN PATENT DOCUMENTS

| | | |
|---|---|---|
| CN | 107750587 A | 3/2018 |
| CN | 112423579 A | 2/2021 |

(Continued)

OTHER PUBLICATIONS

Swedish Office Action and Search Report for Swedish Application No. 2250525-9, Mailed on Nov. 17, 2022.

*Primary Examiner* — Brad Harcourt
(74) *Attorney, Agent, or Firm* — Burr & Forman

(57) ABSTRACT

A skid plate for a robotic lawnmower, comprises an approximately circular plate with a central opening (13), for a hub (6b), and means of attachment (14, 15). The skid plate (2b) is attachable to the robotic lawnmower. An edge portion (7) of the circular plate is bent to extend transversally to a main plane (8) of the circular plate. An outer peripheral edge (11) thereof extends in a single plane.

A robotic lawn mower comprises an electric motor connected to a rotatable cutting head (1b). The cutting head is connected to a cutting disk (3b) with at least one knife (4b) at its periphery. A skid plate (2b) as above is arranged below the cutting disk (3b).

14 Claims, 2 Drawing Sheets

(56)                    References Cited

U.S. PATENT DOCUMENTS

| 4,727,711 | A | * | 3/1988 | Quataert | .............. | A01D 34/661 |
| | | | | | | 56/192 |
| 5,916,111 | A | | 6/1999 | Colens | | |
| 2016/0100523 | A1 | | 4/2016 | Anderson | | |
| 2022/0039321 | A1 | | 2/2022 | Zenkus | | |

FOREIGN PATENT DOCUMENTS

| CN | 216017873 | A | 3/2022 |
|---|---|---|---|
| CZ | 9512 | U1 | 11/1999 |
| DE | 19620737 | A1 | 11/1997 |
| EP | 3571917 | A1 | 11/2019 |
| EP | 3646698 | A1 | 5/2020 |
| EP | 3888441 | A1 | 10/2021 |
| GB | 1281098 | A | 7/1972 |
| JP | S52001561 | U | 1/1977 |
| JP | S63181919 | A | 7/1988 |
| JP | 2010136728 | A | 6/2010 |
| JP | 2019201574 | A | 11/2019 |
| JP | 2021177716 | A | 11/2021 |
| KR | 200362606 | Y1 | 9/2004 |
| NL | 7805129 | A | 11/1979 |
| TW | M281397 | U | 12/2005 |
| WO | 0074466 | A1 | 12/2000 |
| WO | 2021225494 | A1 | 11/2021 |

* cited by examiner

SKID PLATE

FIELD OF THE INVENTION

The present disclosure relates to a skid plate for a robotic lawnmower, comprising an approximately circular plate with a central opening, for a hub, and means of attachment, whereby the skid plate is attachable to said robotic lawn-mower.

The disclosure also relates to a robotic lawn mower comprising an electric motor connected to a rotatable cutting head, which is connected to a cutting disk with at least one knife at its periphery.

BACKGROUND

In areas with high demands on the lawn quality, such as fairways on golf courses, there is a demand for lawn mowers which are able to cut grass at a low cutting height. At the same time, the mowers must avoid scalping the lawn, i. e. cutting into the lawn at an excessively low height or even into the ground. The problem of scalping is particularly pronounced in areas where the ground is uneven and may result in areas where the grass turns brown or is completely removed.

EP3571917B1 discloses a lawn mower which is designed to protect objects left on the ground from the mowing knives. The mower is provided with a bottom disk, below a rotatable cutting disk. The bottom disk has a plurality of prong portions, which extend beyond the knives on the cutting disk.

The prong portions are fairly wide, extending over approximately half of the circumference of the bottom disk, and hence over half of the area which would otherwise be reachable by the knives, had the bottom disk not been mounted on the lawn mower.

The bottom disk may serve well as a guard protecting objects that are accidentally encountered on the ground. At the same time, the risk of scalping is limited. However, the result of the mowing is impaired, and in areas with high demands on the quality of the mowing, the result is not satisfactory. In areas where the cutting height is set to be low, such as fairways on golf courses, this problem is particularly pronounced.

An additional problem with the construction of EP3751917B1 is that the cutting height as such may not be adequate for applications where a low cutting height with a quality is required, since the knives are a considerable distance from the ground, even at their lowest height.

Hence there is a need for a lawn mower which provides a high quality mowing at a low cutting height without scalping the lawn in areas with uneven ground conditions.

SUMMARY

It is an object of the present disclosure to solve, or at least mitigate, parts or all of the above-mentioned problems. To this end, there is provided a skid plate as initially outlined, wherein an edge portion of the circular plate is bent to extend transversally to a main plane of the circular plate, and an outer peripheral edge thereof extends in a single plane.

Hereby a skid plate with an approximate outer shape of a shallow bowl is attained. The skid plate, when arranged at the bottom of the cutting head of a lawn mower, would not present any sharp edges that could accidentally cut into the ground and cause scalping of the lawn. The outer edge of the skid plate is directed transversally to the main plane thereof, which means that it would be directed away from the ground in a mounted position on a lawnmower.

In an embodiment of the skid plate, a cross section of the edge portion thereof has, at least partly, the shape of a circle segment.

Hereby the portion of the skid plate that would most likely come into contact with the ground when it is mounted on a lawn mower may be gentle to the lawn, and scalping may be avoided.

In an embodiment of the skid plate, the circle segment has a radius of 1 to 30 mm.

Hereby the total height of the skid plate is limited, which may be an advantage in applications where a very low cutting height may be desired. In particularly preferable embodiments, the radius is in the interval of 5 to 15 mm, and even more preferably it is approximately 10 mm.

In a further embodiment, the radius of the circle segment is greater than a thickness of the skid plate.

Hereby sharp bends that may scalp, cut or otherwise damage the lawn are eliminated.

In further embodiments a central portion of the circular plate extends in a plane at a distance from a main plane of the circular plate.

Hereby an offset middle portion of the skid plate is attained. Such an offset portion may be useful as a socket for a hub of the cutting head, for fastening elements etc., that would otherwise extend beyond the skid plate in its transversal direction.

In further embodiments the plane of the central portion is arranged at substantially the same level with the outer peripheral edge.

Hereby the height/depth of above-mentioned socket may be maximized without increasing the total outer dimensions of the skid plate. This is advantageous when a low cutting height is desired.

In even further embodiments, the distance between the plane of the central portion and the main plane of the circular plate is between 1 and 30 mm.

As mentioned, a low height of the plate is desirable, for attaining as low a cutting height as possible. In particularly preferable embodiments, the distance is in the interval of 3 to 10 mm, and even more preferably it is approximately 5 mm.

In some embodiments, the central opening and the openings for the fastening elements are arranged in the central portion.

Hereby the fastening elements and the hub of the cutting head are concentrated to a limited portion of the skid plate, leaving the rest of the skid plate as smooth as possible. For embodiments where the central portion is offset from the main plane of the circular skid plate, no parts of the hub or the fastening elements may extend beyond the main plane of the skid plate when it has been mounted on a lawn mower. The risk of scalping the lawn by these parts is eliminated, while the outer dimensions are kept at a minimum.

In some embodiments, the skid plate is manufactured from steel.

Hereby a durable skid plate may be provided. The risk of deformation of the plate is minimized, and the risk that a deformed plate, with possibly sharp edges, would cause unexpected scalping of the lawn by an undesired shape is eliminated.

According to the second aspect, parts or all of the above-mentioned problems are solved, or at least mitigated, by a robotic lawn mower, wherein a skid plate according to the disclosure is arranged below the cutting disk.

Hereby a lawnmower, wherein the risk of scalping the lawn is considerably reduced or eliminated, is attained. The rounded, lower edge portion may most likely be the part that primarily contacts the ground, as the mower moves across the area to be mowed.

In an embodiment of the second aspect, the knives of the cutting disk are arranged to extend above and partly radially outside of the skid plate.

Hereby, the knives may contact the grass all around the circumference of the skid plate, and the cutting result may be of a high quality.

In some embodiments attachment means for attachment of the knives to the cutting disk extend below the level of the outer peripheral edge of the skid plate.

Hereby it may be possible to mount the skid plate very close to the cutting disk. The attachment means need not be accommodated completely above the skid plate, but may be allowed to extend downwards, i. e. be partly nested within the skid plate. Hence the cutting disk and the knives thereon may be mounted very close to the ground level in the lawn mower. Only the skid plate may separate the ground from the knives, and thereby prevent scalping of the lawn.

In some embodiments a hub of the cutting head extends through the central opening of the skid plate, and a main plane of the skid plate is arranged below the hub.

Hereby the outer dimensions of the cutting arrangement in the lawn mower are further minimized. The hub of the cutting head may be arranged completely within the outer limits of the skid plate, as seen both axially and radially.

In some embodiments the knives are pivotably arranged on the cutting disk.

Hereby a further measure to eliminate the risk of scalping the lawn is provided. The knives may pivot inwards if they encounter too high a cutting resistance. In the unlikely event that a knife contacts the ground or bottom parts of the lawn, despite the provision of the disclosed skid plate, they may not move forward with the rotating cutting disk but may yield and pivot inside the outer periphery of the cutting disk and the skid plate. Hence the lawn may not be damaged thereby.

It is noted that embodiments of the invention may be embodied by all possible combinations of features recited in the claims. Further, it will be appreciated that the various embodiments described for the device are all combinable with the method as defined in accordance with the second aspect of the present invention, and vice versa.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

All the figures are schematic, not necessarily to scale, and generally only show parts which are necessary in order to elucidate the embodiments, wherein other parts may be omitted.

DETAILED DESCRIPTION OF THE EXEMPLARY EMBODIMENTS

Figures 1A, 1B:
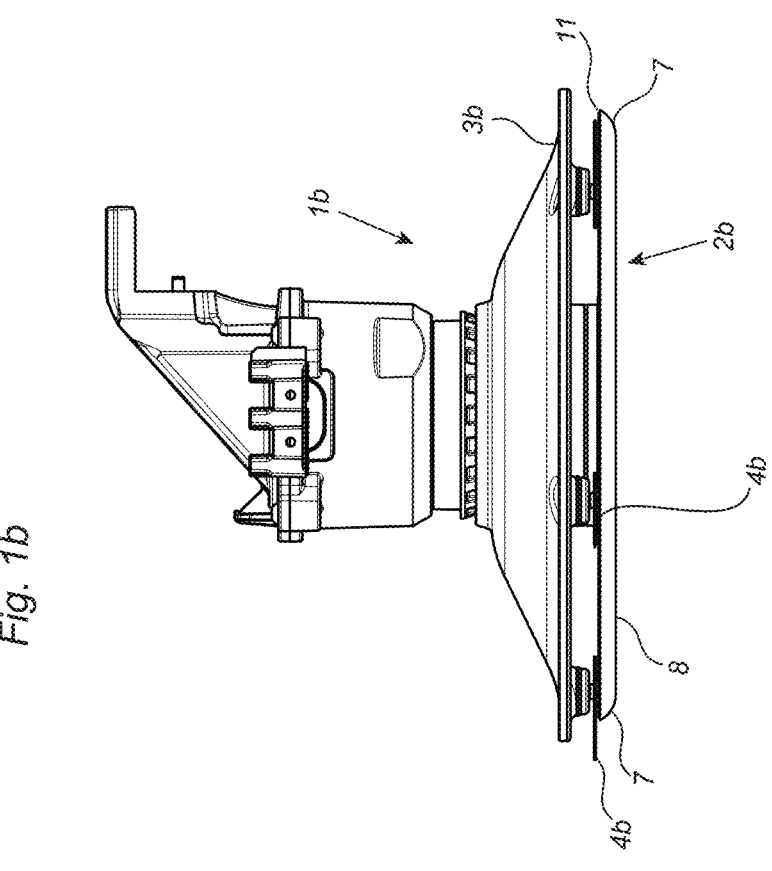
FIG. 1a is a diagrammatic view from the side of a cutting head with a skid plate according to the prior art.
FIG. 1b is a view according to that of FIG. 1a of a cutting head with a skid plate according to the disclosure.

FIG. 1a illustrates a cutting head 1a with a skid plate 2a according to the prior art. A cutting disk 3a is arranged above the skid plate 2a, to be rotated by the cutting head 1a. A number of knives 4a are arranged on the cutting disk 3a, close to the periphery thereof. The knives 4a may be arranged pivotably or fixedly with attachment means 5a, in accordance with any of the technologies known from the prior art. A hub 6a of the cutting head 1a extends below the skid plate 2a.

In order to accomplish mowing at a low height the skid plate 2a has to move along the ground very close thereto. If the ground is uneven, it is obvious that both the outer edge of the skid plate 2a and the knives 4a may contact the ground from the side and risk scalping the lawn. The cutting head 1a is, in many applications, slightly tilted forward, with the cutting disk 3a and the skid plate 2a being slightly tilted as well. This increases the risk of scalping the lawn.

FIG. 1b illustrates a cutting head 1b with a skid plate 2b according to the present disclosure. The cutting head 1b has a cutting disk 3b, corresponding to that of the prior art, mounted thereon. A number of knives 4b are mounted on the cutting disk 3b in a manner which is known as such from the prior art. The knives 4b may be fixed in some embodiments, but it is a particular advantage if they are pivotally mounted, so that they yield when they encounter an obstacle. The attachment means 5b are not visible in FIG. 1b, but they may be discerned in FIG. 2.

The skid plate 2b is preferably connected to the cutting head via a bearing arrangement 9, such that the skid plate 2b is not caused to rotate by the motor rotating the cutting disk 3b. The skid plate 2b may slide in contact with the lawn in a translating motion according to the movements of the robotic lawn mower, but it avoids a constant rotation, which may be detrimental to the lawn.

The disclosed embodiment of the skid plate 2b comprises a circular plate, which has a main plane 8 of extension, which coincides with the downwards facing surface of the skid plate 2b.

The skid plate 2b has an edge portion 7, which extends transversally to the main plane 8 of the circular plate. The skid plate 2b of the disclosure hence has a somewhat greater extent in an axial direction than the skid plate 2a of the prior art.

Figure 2:
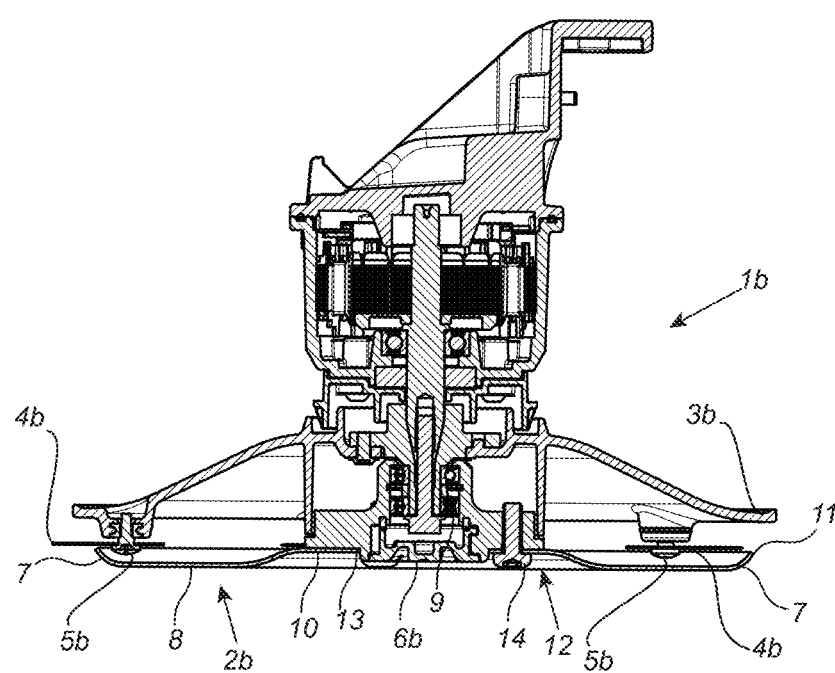
FIG. 2 is a sectional view from the side of the cutting head and the skid plate according to FIG. 1b.

The edge portion 7 is bent upwards, as seen in FIG. 1b and FIG. 2, resulting in a bowl-like shape of the skid plate 2b. The outer peripheral edge 11 is substantially circular and extends continuously in a single plane. Inside of the edge portion 7, there is a free space between the level of the outer/upper edge of the edge portion 7 and the level of the main plane 8. In this free space, the attachment means 5b of the knives 4b may be accommodated. As the free space is substantially circular, the attachment means 5b may be rotatable with the cutting disk 3b around a central axis of the cutting head 1b.

During rotation of the cutting disk 3b, the attachment means 5b move around the central axis in a circular motion, inside the edge portion 7 and below the level of the outer peripheral edge. The attachment means 5a do not interfere with the grass to be cut, although they move close to the ground, only separated therefrom by the main plane 8 of the skid plate 2*b*.

FIG. 2 also illustrates that a central portion 10 of the skid plate 2*b* is offset from the main plane 8. In the illustrated embodiment, the central portion 10 is arranged at substantially the same level as the outer peripheral edge 11 of the skid plate 2*b*. A resulting socket 12 has a similar extension in the axial direction as the edge portion 7. The maximal total height in the axial direction of the skid plate 2*b* is hence substantially unaffected by the central portion 10.

The socket 12 has a central opening 13 through the offset plate, and the hub 6 may extend therethrough in the mounted position of the skid plate 2*b*. Since the opening 13 is offset from the main plane 8 of the skid plate 2*b*, the socket 12 may accommodate the hub 6 therein in its entirety. The hub 6 may not extend outside of the socket 12, and the skid plate 2*b* may be positioned at a minimal distance from the ground during mowing.

Figure 3:
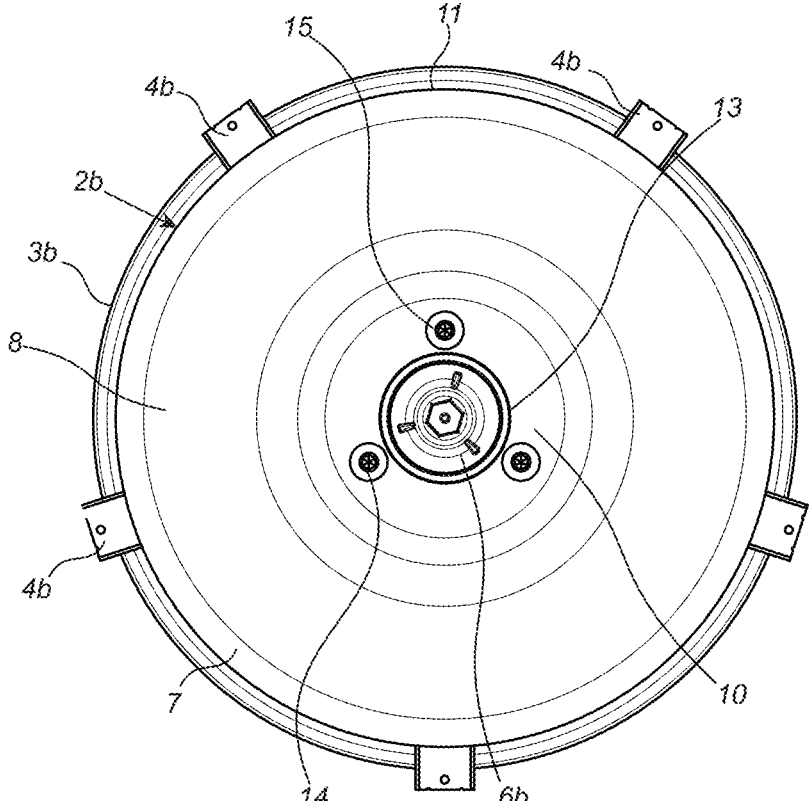
FIG. 3 is a view from below of the skid plate and cutting head of FIGS. 1b and 2.

Also, one or more fastening elements 14 for fastening the skid plate 2*b* to the hub 6 are arranged and fully accommodated in the socket 12. The skid plate 2*b* is provided with one or more openings 15 therefor. These fastening elements 14 are visible also in FIG. 3. Since neither the hub 6 nor the fastening elements 14 extend outside of the socket 12, very low cutting heights may be possible. Other means of attachment may be considered in some embodiments, instead of the holes 15 with the fastening elements 14 therethrough. For example, a bayonet mount may be used.

According to the disclosure, in the robotic mower the knives 4*b* are arranged on the cutting disk 3*b* to be rotated thereby. The skid plate 2*b* is arranged below the knives 4*b*, so that they extend through a narrow slot between the cutting disk 3*b* and the skid plate 2*b*. Since the skid plate 2*b* is designed to accommodate the attachment means 5*b*, the slot between the cutting disk 3*b* and the skid plate 2*b* may be minimal, and the knives 4*b* may rotate very close to the ground.

In order to allow the mounting of the disclosed skid plate 2*b* on existing cutting heads, with all the advantages described above, the axial dimension of the cutting disk 3*b* may be greater than that of the cutting disk 3*a* according to the prior art (FIG. 1*a*). The cutting disks 3*a*, 3*b* are attached to the mower at the same level, but the greater axial dimension of the disclosed cutting disk 3*b* positions the knives 4*b* closer to the ground than in the prior art. In particularly advantageous embodiments, the knives may be arranged approximately 10 mm closer to the ground than in the prior art. The disclosed skid plate 2*b* described above may fit well in the remaining space between the knives 4*b* and the ground.

Since the knives 4*b* preferably are pivotally arranged, they may yield and rotate back more or less within the perimeter of the skid plate 2*b*, if they encounter an obstacle or excessive resistance. This feature minimizes the risk of scalping the lawn. The gentle curve of the edge portion 7 of the skid plate 2*b* has the same effect of minimizing the scalping risk. These two features work independently of one another, but the combination of them in a robotic lawn mower is of course particularly advantageous.

The invention has mainly been described above with reference to a few embodiments. However, as is readily appreciated by a person skilled in the art, other embodiments than the ones disclosed above are equally possible within the scope of the invention, as defined by the appended patent claims.

In the claims, the word "comprising" does not exclude other elements or steps, and the indefinite article "a" or "an" does not exclude a plurality.

The invention claimed is:

1. A skid plate for a robotic lawnmower, the skid plate comprising an approximately circular plate with a central opening, for a hub, and means of attachment, whereby the skid plate is attachable to said robotic lawnmower, wherein an edge portion of the circular plate is bent to extend transversally to a main plane of the circular plate, and an outer peripheral edge thereof extends in a single plane,
    wherein a cross section of the edge portion has, at least partly, a shape of a circle segment, and
    wherein the circle segment has a radius of 1 to 30 mm.

2. The skid plate according to claim 1, wherein the radius of the circle segment is greater than a thickness of the skid plate.

3. The skid plate according to claim 1, wherein a central portion of the circular plate extends in a plane at a distance from the main plane of the circular plate.

4. The skid plate according to claim 3, wherein the plane of the central portion is arranged at substantially a same level with the outer peripheral edge.

5. The skid plate according to claim 3, wherein a distance between the plane of the central portion and the main plane of the circular plate is between 1 and 30 mm.

6. The skid plate according to claim 3, wherein the means of attachment comprises openings for receiving fastening elements, and wherein the central opening and the openings for the fastening elements are arranged in the central portion.

7. The skid plate according to claim 1, wherein the skid plate is manufactured from steel.

8. A robotic lawn mower comprising an electric motor connected to a rotatable cutting head, which is connected to a cutting disk with at least one knife at its periphery, and the skid plate of claim 1, arranged below the cutting disk.

9. The robotic lawn mower according to claim 8, wherein the at least one knife comprises multiple knives of the cutting disk that are arranged to extend above and partly radially outside of the skid plate.

10. The robotic lawn mower according to claim 9, wherein attachment means for attachment of the knives to the cutting disk extend below the level of the outer peripheral edge of the skid plate.

11. The robotic lawn mower according to claim 9, wherein the knives are pivotably arranged on the cutting disk.

12. The robotic lawn mower according to claim 8, wherein a hub of the cutting head extends through the central opening of the skid plate, and a main plane of the skid plate is arranged below the hub.

13. A skid plate for a robotic lawnmower, the skid plate comprising an approximately circular plate with a central opening, for a hub, and means of attachment, whereby the skid plate is attachable to said robotic lawnmower, wherein an edge portion of the circular plate is bent to extend transversally to a main plane of the circular plate, and an outer peripheral edge thereof extends in a single plane,
    wherein a central portion of the circular plate extends in a plane at a distance from the main plane of the circular plate, and
    wherein a distance between the plane of the central portion and the main plane of the circular plate is between 1 and 30 mm.

14. A robotic lawn mower comprising an electric motor connected to a rotatable cutting head, which is connected to a cutting disk with at least one knife at its periphery, and a skid plate arranged below the cutting disk, wherein the skid plate includes an approximately circular plate with a central opening, for a hub, and means of attachment, whereby the skid plate is attachable to said robotic lawnmower, wherein an edge portion of the circular plate is bent to extend transversally to a main plane of the circular plate, and an outer peripheral edge thereof extends in a single plane, wherein the at least one knife comprises multiple knives of the cutting disk that are arranged to extend above and partly radially outside of the skid plate, and wherein attachment means for attachment of the knives to the cutting disk extend below the level of the outer peripheral edge of the skid plate.

\* \* \* \* \*